Nov. 1, 1960  K. PITTS ET AL  2,958,369
VEHICLE SEAT CONSTRUCTION
Filed Feb. 19, 1957  5 Sheets-Sheet 1

INVENTORS.
Kennard Pitts
Elmer A. Herider
BY
Webb, Mackey & Burden
THEIR ATTORNEYS Nov. 1, 1960 K. PITTS ET AL 2,958,369
VEHICLE SEAT CONSTRUCTION
Filed Feb. 19, 1957 5 Sheets-Sheet 5

INVENTORS.
Kennard Pitts
Elmer A. Herider
BY Webb, Mackey & Burden
THEIR ATTORNEYS

United States Patent Office 2,958,369
Patented Nov. 1, 1960

2,958,369

VEHICLE SEAT CONSTRUCTION

Kennard Pitts, Detroit, and Elmer A. Herider, Dearborn Township, Wayne County, Mich., assignors to Rockwell-Standard Corporation, a corporation of Pennsylvania Filed Feb. 19, 1957, Ser. No. 641,183

26 Claims. (Cl. 155—5)

The present invention relates to a seat construction for vehicles, particularly a vehicle front seat of the plural cushion type arranged on a common base frame and with the seat cushion proper divided into outer seat members plus an intermediate seat member on that frame, each of the outer seat members being eccentrically mounted on a fixed pivot axis to the common frame for a combined outwardly turning and rearwardly shifting movement to facilitate entrance or exit of a passenger from the seat. More specifically, the eccentricity of the fixed pivot is towards both the inner and rear edges of each outer member in a general sense and preferably passes through the rear edge of that seat member in producing the desired combination of movement just described.

As indicated, this invention is primarily adapted for vehicle front seats and for this purpose it preferably embodies a split type folding back rest wherein each of the halves of the back rest is connected to turn with one of the outer seat members, but at the same time each back rest half is arranged to pivot on that connection to fold face downwardly in the usual way upon the seating surface. The inner corners of these back rest halves are relieved at their lower ends in the vicinity of the intermediate seat member which, in accordance with this invention, is composed of front and rear cushion sections joined together at their adjacent ends and normally occupying a recess between the outer seat members. These front and rear cushion sections have the novel feature of pivotally breaking upwardly at the joint to convert into an arm rest arrangement with one of the cushion sections having a raised horizontal disposition above the recess between the inner ends of the outer seat members and the other cushion section protruding rearwardly in a downwardly offset position into the recess formed by the adjacent relieved corners of the back rest halves just noted.

According to a feature of the invention of the preceding paragraph, the intermediate seat member has sufficient clearance to convert into its raised arm rest position or occupy the depressed position thereof in the seat recess without interfering with the turning of the outer seat members and similarly the outer members have freedom to turn with the intermediate member occupying either of its positions. A further feature is the provision of a seat slide structure on the under portion of the common base frame for the divided seat cushion, enabling forward and rearward adjustment of the seat construction as a whole on that common slide and independently of the pivoting action of the seat members and the back rest halves.

Further features, objects, and advantages will either be specifically pointed out or become apparent when for a better understanding of the invention, reference is made to the following description taken in conjunction with the accompanying drawings which show a preferred embodiment thereof and in which.

Figure 1:
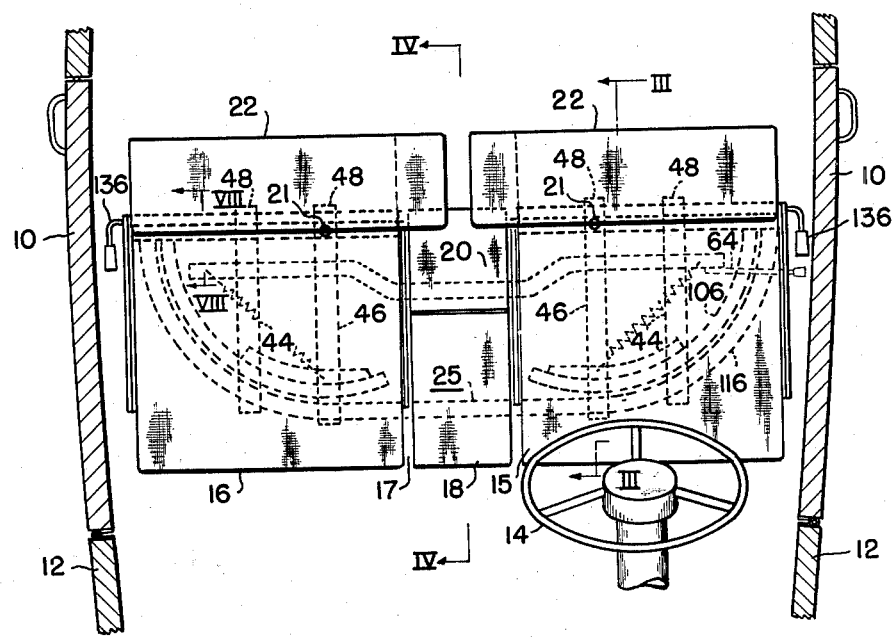
Figure 1 is a plan view of a preferred embodiment of the invention incorporated in a vehicle front seat having the cushion members in normal position.
Figure 2:
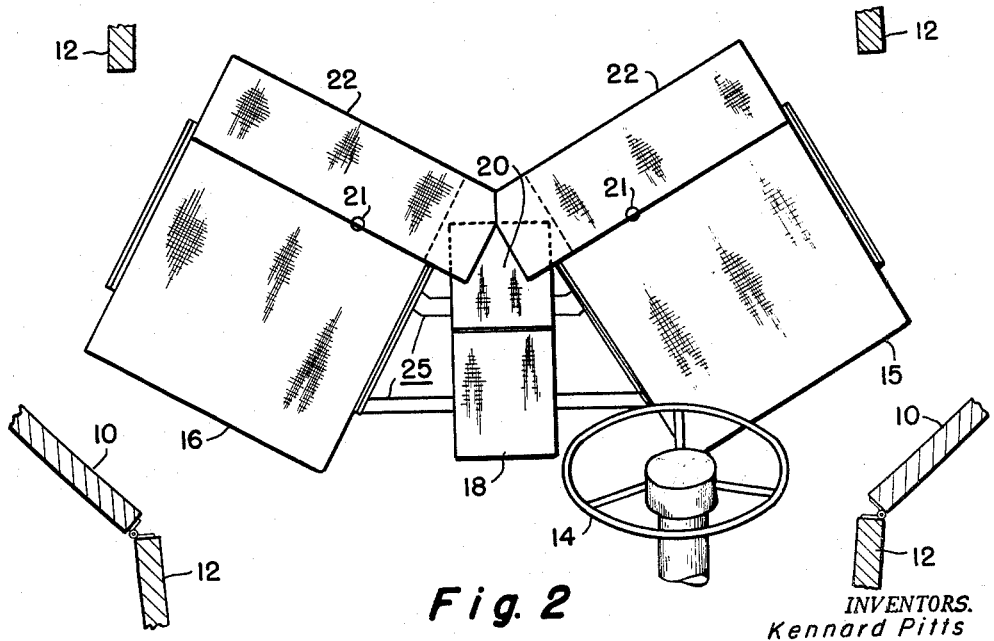
Figure 2 is a similar view showing the seat cushion members in moved positions.

In the drawings, the present invention is shown in Figures 1 and 2 in use as the front seat structure between the hinged doors 10 at the sides of the passenger compartment of an automotive vehicle 12. A steering wheel 14 at the front of the passenger compartment is disposed adjacent the seat structure.

Figure 4:
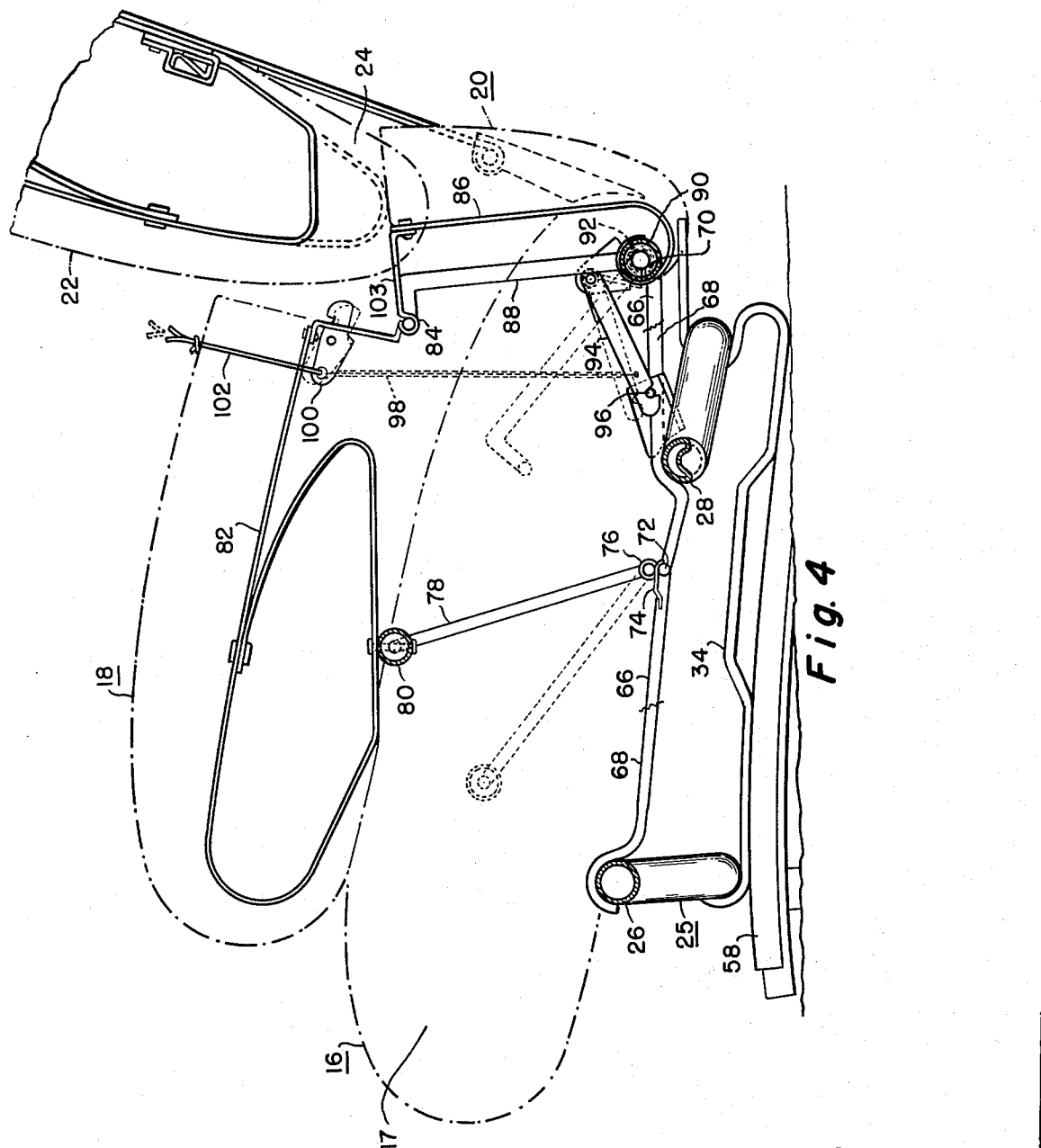

A pair of outer cushion members 15 and 16 forms the entire opposite end portions of the seating surface of the seat structure and these members define an included gap or recess 17 therebetween which receives a center cushion member formed of hinged together front and rear cushion sections 18 and 20. The cushion members 15, 16 and the sections 18 and 20 of the center member rest on a common supporting frame 25 of generally tubular construction which is bow-shaped between its opposite ends. The outer seat cushion members 15 and 16 have pivots 21 on which they turn outwardly and shift rearwardly with a combined motion to retract from the vehicle instrument panel, not shown, and simultaneously advance toward the path of access provided by the open doors 10. The respective outer members 15 and 16 carry the split halves of a split type folding back rest constituted by strip spring type cushions 22 which turn with the outer members 15 and 16. The back rest cushions 22 bridge across the center seat cushion member and confront one another in closely spaced relationship when mutually aligned to form the common back rest for the seating assembly and they are relieved at their lower inner corners by foreshortening the spring strips to define an arm-rest receiving recess 24 hereinafter described in connection with the operation of the hinged together front and rear cushion sections 18 and 20 (Figure 4).

Figure 3:
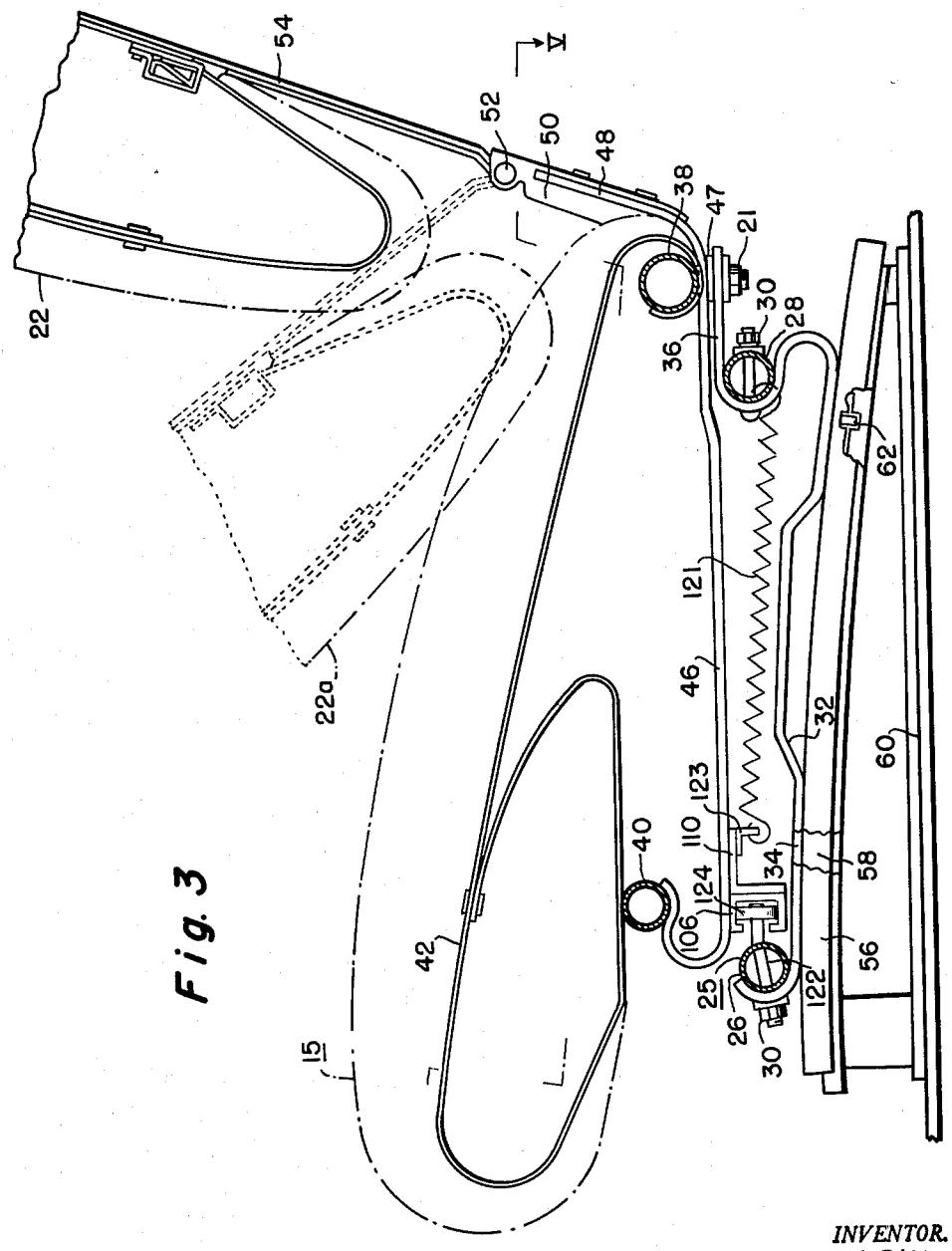
Figures 3 and 4 are sectional views in side elevation taken along the lines III—III and IV—IV in Figure 1.

The bow-shaped supporting frame 25 comprises a spaced pair of longitudinally extending members 26 and 28 at the front and rear respectively which are bolted at 30 directly to and carry a spaced pair of foot brackets 32 and 34 made of heavy metal cross straps bridging between the frame members and individually bent to form a rear strap extension 36, each carrying one of the cushion member pivots 21 (Figure 3). Each pivot 21 has its upper terminal anchored in a longitudinally extending tube which forms the rear frame member 38 in the seat cushion frames for the individual cushion members 15 and 16 each of which further includes a front tube member 40 in the frame. The respective front and rear cushion frame members 40 and 38 mutually carry a row of spring steel strips 42 forming resilient seat elements which are padded with the usual foam rubber and covered with upholstery cloth, but these particular spring strips 42 form no per se part of the present invention and are of the type generally as shown and claimed in the copending Pitts et al. application, Serial No. 637,456, filed January 31, 1957, and assigned to the assignee of the present invention, now Patent No. 2,834,403, granted May 13, 1958.

The front and rear cushion frame members 40 and 38 further carry a pair of spaced metal cross straps 44 and 46 (Figures 1 and 3) of which the inner one 46 has a wear washer 47 bearing on the strap extension 36 to provide for pivoting action of the seat cushion frame on the pivot 21. Individual rear strap extensions 48 on the cross straps 44 and 46 cooperate by pairs to form spaced standards for two back rest mounting brackets 50 each carrying a horizontal hinge pin 52 on which the different back rest cushions 22 pivot. A rigid metal strap 54 of inverted U-shape carries each back rest cushion 22 and has its depending pair of legs turned at the lower end to form a hinge joint about the pin 52 and this joint preferably includes a torsion return spring, not shown, to hold the back rest cushion 22 generally upright. A simple one-handed operation readily overcomes the resistance of this torsion return spring to fold the back rest cushion 22 in the desired manner into the dotted line position 22a face down upon the seating surface.

The spaced foot brackets 32 and 34 mount the lower portion of the supporting frame 25 to a pair of convention seat slides which in Figure 3 are indicated at 56 and 58 respectively, fastened directly to a vehicle floor pan 60 or a like fixed support so as to provide for forward and rearward adjustment of the seat structure as a whole in the usual way. A releasable latch 62 fits in a series of locking notches on the seat slides for locking them after an adjustment is made and a control handle 64 connected to the latch 62 protrudes laterally from below the outer cushion member 15 on the driver's side of the seat structure for conveniently releasing the latch.

In Figure 4 the front and rear cushion sections 18 and 20 forming the center seat cushion member constitute no per se part of the present invention and are fully described and separately claimed in the copending Pitts et al. application, Serial No. 640,432, filed February 15, 1957, and assigned to the assignee of the present application, now Patent No. 2,893,473, filed July 7, 1959. Essentially, however, the cushion sections 18 and 20 have a parallelogram linkage swingably mounting them to a subframe formed of closely spaced side rods 66, 68 which bridge between points of securement on the front and rear members 26, 28 in the supporting frame 25 and which form cantilever rod extensions at the rear which are upwardly offset and turned to loop into spaced apart eye portions 70. The side rods 66, 68 are symmetrical to one another and have a pair of transversely offset midportions 72 which support an interconnection bracket 74 for the subframe carrying a looped strap bearing 76. A U-shaped rod 78 has its base pivoted in the bearing 76 to form the front link of the parallelogram linkage and carries a hinge bracket on which a spring retainer bar 80 is journalled to rotate at the upper ends of the legs of the rod 78. A row of spring steel strips 82 is secured fast to the upper side of the rotatable retainer 80 to form the resilient elements in the front cushion section 18 and at their rear extremities, the strips 82 are secured to one of the leaves in a hinge 84 forming another joint in the parallelogram linkage. The other leaf of the hinge 84 carries the ends of another row of spring steel strips 86 forming the resilient elements in the rear cushion section 20.

The rear cushion section 20 incorporates a frame rod 88 bent to an inverted U-shape and having the upwardly extending base portion thereof offset to form the hinge pin in the eyes of the leaves of the hinge 84. At the lower end the legs of the rod 88 terminate in inturned stub portions pivotally received in the eye portions 70 so as to enable the cushion section 20 to be included as the rear link of the parallelogram linkage. The lower ends of the strips 86 are secured to a spring retainer tube 90 carried on the inturned stub portions of the legs of the rod 88. A torsion lift spring having a set of coils 92 coaxial with the tube 90 biases the rod 88 upwardly thereby elevating the front cushion section 18 which is kept level and forming the rear cushion section 20 into the gap or recess 24 formed by the relieved corners of the back rest cushions 22. A pivoted latching device 94 carried by the frame rod 88 engages a fixed pin 96 on the subframe to lock the rod at the joint thereby latching the cushion sections in their upright positions. The latching device 94 is connected by means of a flexible chain 98 to a spring latch 100. In the upright position of the cushion sections shown in Figure 4, the sole function of the spring latch 100 is to interconnect and transmit motion from a manual pull cord 102 to the chain 98 so as to lift the latching device 94 into the unlatched dotted line position shown. Then the parallelogram linkage is swung downwardly through their dotted line positions shown due to manual pressure exerted on the seat cushion sections 18 or 20 so that they occupy the seat recess 17 (Figure 1), whereupon the spring latch 100 on one of the hinge leaves automatically engages the margin 103 of a confronting slot in the other hinge leaf to latch the cushions 18 and 20 in end to end alignment flush with the seating surface.

Figure 5:
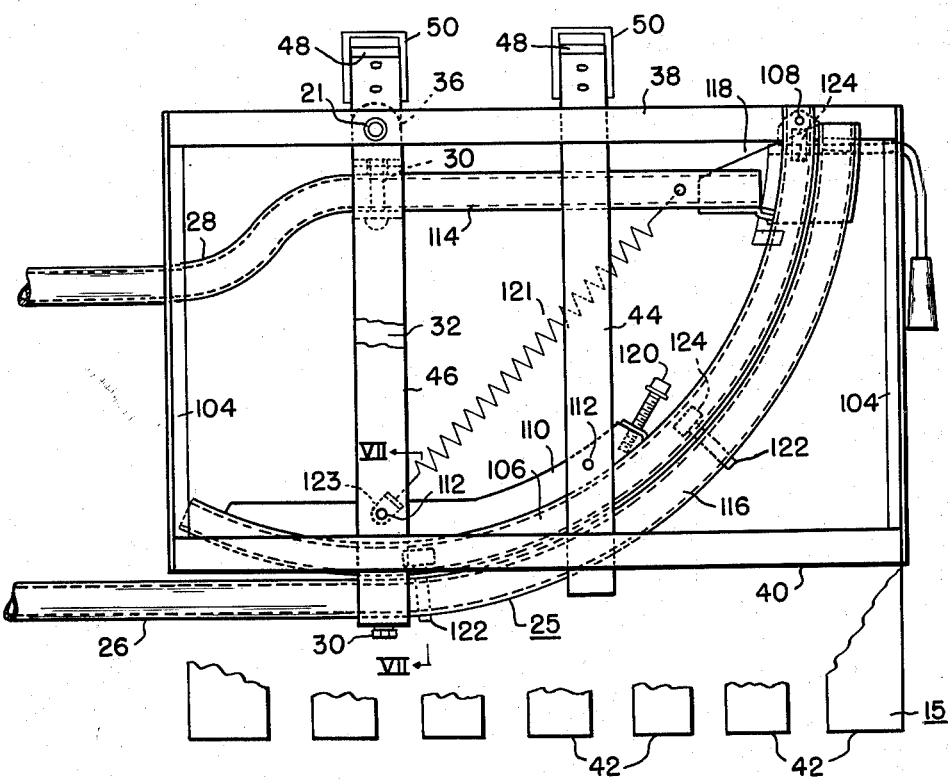
Figure 5 is a plan view of the supporting frame taken along the section lines V—V in Figure 3.
Figure 6:
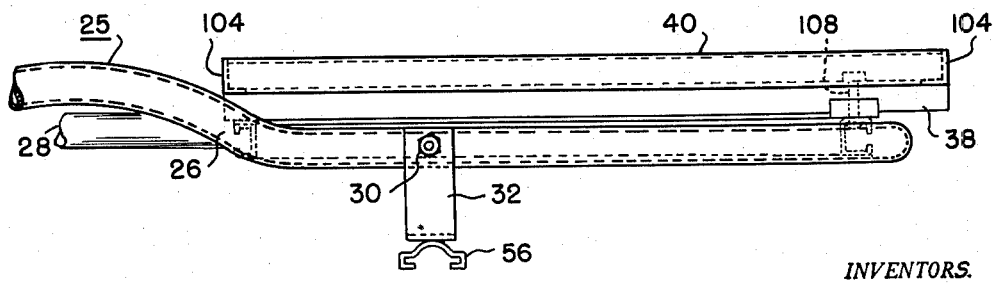
Figure 6 is a front elevational view of the frame of Figure 5.

The frame 25 and associated means for supporting the seat cushion members 15 and 16 is substantially identical at the opposite ends of the seat structure and in the interests of brevity will be described only in connection with the outer seat cushion member 15. In Figures 3, 5, and 6, the frame for the cushion member 15 includes the front and rear frame members 40 and 38 which in addition to being rigidly joined together by means of the intermediate cross straps 44 and 46 are joined at the ends by a pair of side rails 104 formed of lengths of angle iron. The cross straps 44 and 46 carry a length of curved channel rail 106 arranged there below with one end portion terminating adjacent the side rail 104 adjacent the inner edge of the cushion 15, with the midportion of the rail passing adjacent the geometric midcenter of the cushion 15, and with the opposite end having a bolt connection 108 to the rear cushion frame member 38. The curved rail 106 has an intervening mounting bracket 110 of angle iron which is bolted directly at 112 to the underside of the straps 44 and 46. The longitudinally extending pair of members in the bow-shaped supporting frame 25 are formed of metal tubes so arranged that the opposite end lengths of the rear member 28 of the pair consist of substantially straight tubing 114 whereas the front member 26 has curved tubing 116 at each end bent rearwardly to join the straight tubing 114 at that end of the frame. A rigid end bracket 118 provided at this juncture presents a first fixed flange engageable by a bumper stop 120 comprising a stud threaded in a transversely offset position to the mounting bracket 110 for the curved rail 106 for adjustably limiting the rearward travel of the latter. A cushion retracting spring 121 is stretched to pull elastically at one end against an anchor 123 rigid with the rail mounting bracket 110 and pulls at the opposite end against the stationary straight tubing 114 which has an anchoring hole in which the spring is lodged. These opposite anchor points for the retracting spring 121 are so located that it acts in a path substantially parallel to the curved channel rail 106 to bias the outer cushion to a rearwardly pivoted position at which the bumper stop 120 is engaged.

The companion lengths 106, 116 of rail and tubing occupy the common plane of the supporting frame 25 and they are both curved on the arc of a circle about the pivot 21 as a center. Three cross pins 122 solidly lodged in the curved tubing 116 project at spaced points from the same side thereof to form converging stub axles carrying a like number of rollers 124 which are disposed in a ring offset from the tubing and which fit within the curved rail 106 to guide it for endwise running movement inboard of the curved tubing 116. The cushion frame strap members 44 and 46 therefore pivot under the load of the cushion with an antifriction action in the next adjacent plane above that of the supporting frame 25 and about the pivot 21, the vertical axis of which provides for an eccentricity of movement of the cushion 15 characterized by being offset towards its inner and rear edges as compared to the geometric midcenter thereof.

Figure 7:
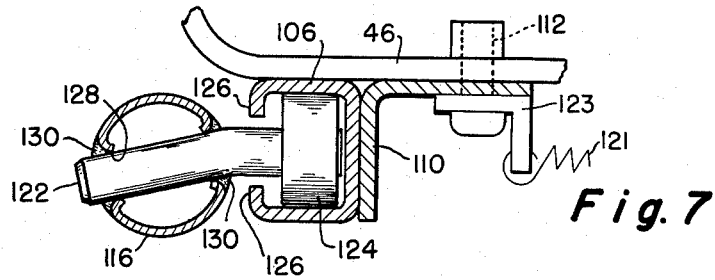
Figure 7 is an enlarged fragmentary section taken along lines VII—VII of Figure 5.

In Figure 7, the channel rail 106 is generally C-shaped in cross section, being open at the side confronting the curved tubing 116 and having a pair of short inturned flanges 126 at that side to retain the roller 124 therein. Each cross pin 122 projects between these flanges 126 and is smooth on the stub axle portion on which the associated roller 124 is therefore free to rotate about a fixed axis and also free to move along that axis on the stub axle portion so as to center itself in a plane of contact with the opposite inner surfaces of the upper and lower legs of the channel rail 106. Each cross pin 122 is lodged in a pair of registering openings 128 through the curved tubing 116 having welds 130 at the opposite mouths thereof to hold the pin 122 solidly.

Figure 9:
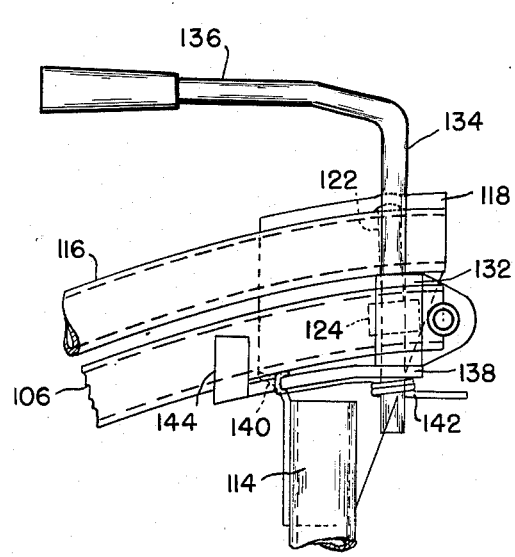
Figure 9 is a top plan view of the structure shown in Figure 8.
Figure 8:
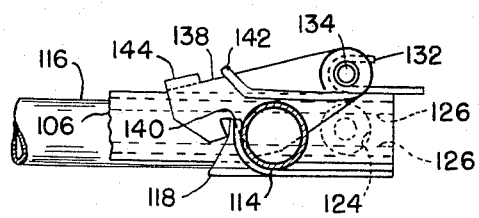
Figure 8 is an enlarged fragmentary section taken along lines VIII—VIII of Figure 1.

In Figures 8 and 9, the curved channel rail 106 at each end of the seat structure carries a bearing bracket 132 at its extremity which journals a captive cross shaft 134 each presenting an integral crank handle 136 at the rear side of the different outer cushion members 15 and 16. The individual crank handles 136 control a latch 138 fast to each cross shaft 134 and engageable with the edge of a second fixed flange 140 carried by the adjacent end bracket 118. A latch spring 142 biases the latch 138 downwardly to a position where it will automatically latch on the flange 140 and an integral flange 144 on the latch 138 projects laterally therefrom to engage the top of the curved channel rail 106 and limit downward travel thereof.

In operating the present seat structure, the occupant on the driver's side moves the control handle 64 forwardly (Figure 1) to withdraw the latch 62 (Figure 3) from the slides 56 and 58 for adjusting the seat structure as a whole forwardly and rearwardly in the vehicle. The occupant of either end cushion member 15 or 16 manually lifts the adjacent crank handle 136 (Figure 1) to lift the latch 138 (Figure 8) to free the curved channel rail 106 from its latched connection to the curved tubing 116 for swinging the appropriate end cushion member to the solid line position shown in Figure 2. This movement is facilitated not only by the fact that the rail 106 runs with an antifriction action on the loosely running self centering rollers 124 which may be made of nylon, but also with the assistance of the cushion retracting spring 121 which immediately starts to foreshorten when the latch is released. When the center cushion member is unoccupied, the seat occupant at either end of the seat may grasp and raise the pull cord 102 (Figure 4) with a slight tug, releasing the spring latch 100 between the leaves of the hinge 84 to enable the coils 92 of the torsion spring to start unwinding. Therefore, the cushion sections 20 and 18, of which the section 18 retains its substantially level attitude as top link on the parallelogram linkage, swing upwardly on that linkage into the solid line position of Figure 4 in which the pivoted latching device 94 drags across and latches upon the pin 96 and simultaneously the chain 98 straightens out nearly taut in a substantially vertical disposition. Return of the cushion sections 18 and 20 into the seating surface is accomplished by lifting the pull cord 102 so as to lift the latching device 94 on the end of the chain and thereafter downward pressure is applied to the top of the cushion section 18 so as to swing the rods 78 and 88 past their dotted line positions shown enabling the sections 18 and 20 to align in end to end relationship within the recess 17 in the seat. While thus disposed in the recess 17 the cushion sections 18 and 20 in no manner interfere with the rear seat passengers when they urge forward pivoting of the back rest cushions 22 into the dotted line position 22a of Figure 3 which can occur regardless of whether the outer cushion members 15 and 16 are outturned according to Figure 2 or occupy the normal position holding the cushions 22 in alignment according to Figure 1.

Variations within the spirit and scope of the invention described are equally comprehended by the foregoing description.

We claim:

1. A plural cushion seat construction comprising a generally bow-shaped supporting frame common to the cushions and having its ends curved on the arc of a circle, means mounting a center one of said seat cushions to the midportion of said frame, means pivoting outer ones of the cushions on a vertical axis eccentric thereto which is fixed relative to said frame adjacent the rear edge thereof, said construction arranged in a manner wherein said outer cushions carry lengths of channel rail which are complementarily curved and shiftably mounted to the respective curved ends of the frame in a load carrying relationship to provide for turning action of said outer cushions about their eccentric pivot axes, and wherein said outer cushions further carry captive back rest cushions turning therewith and being relieved at their lower edges to bridge across the center cushion to a point of closely spaced adjacency thereover to form a common back rest for the seat construction.

2. A plural cushion seat construction comprising a generally bow-shaped supporting frame common to the cushions and having its ends curved on the arc of a circle, means mounting a center one of said seat cushions to the midportion of said frame, means pivoting outer ones of the cushions on a vertical axis eccentric thereto which is fixed relative to said frame adjacent the rear edge thereof, said construction arranged in a manner wherein said outer cushions carry lengths of channel rail which are complementarily curved and shiftably mounted to the respective curved ends of the frame in a load carrying relationship to provide for turning action of said cushions about their eccentric pivot axes, wherein each length of said channel rail has a midportion passing adjacent the geometric center of the associated cushion and arranged with its ends diverging outwardly from the midportion in directions towards different edges of said cushion, wherein said first named means swingably mounts the center seat cushion to pivot upwardly from the seating surface so as to be convertible into an arm rest, and wherein said outer seat cushions further carry captive back rests turning therewith and having their adjacent ends closely spaced to one another, said construction further including elastic means acting substantially parallel to each length of channel rail to bias the outer cushion to a rearwardly pivoted position, and means to latch each outer cushion in a frontward position whereby the inner ends of said back rests are locked in squarely confronting alignment to form a common back rest for the seat construction, the inner ends of said back rests having their lower corners relieved with sufficient clearance to accommodate the presence of the upwardly pivoting center seat cushion enabling each back rest to pivot independently thereof.

3. A plural cushion seat construction comprising a generally bow-shaped supporting frame common to the cushions and having its ends curved on the arc of a circle, means mounting a center one of said seat cushions to the midportion of said frame, means pivoting outer ones of the cushions on a vertical axis eccentric thereto which is fixed relative to said frame adjacent the rear edge thereof, said construction arranged in a manner wherein said outer cushions carry lengths of channel rail which are complementarily curved and shiftably mounted to the respective curved ends of the frame in a load carrying relationship to provide for turning action of said cushions about their eccentric pivot axes, wherein each length of said channel rail has a midportion passing adjacent the geometric center of the associated cushion and arranged with its ends diverging outwardly from the midportion in directions towards different edges of said cushion, and wherein said bow-shaped frame is of tubular construction and includes a rear tube with substantially straight opposite ends joined to said curved portion of the frame, a transversely offset stop rigid with each of said lengths of channel rail carried by the outer cushions and engageable with said opposite end junctures of said rear tube to limit rearward pivoting of each outer cushion, and a latch at the outer end of each of said lengths of rail and engageable with said opposite end junctures of said rear tube to latch each cushion in its forward position.

4. A plural cushion seat construction according to claim 3 wherein said stop includes a bumper mounted on threads to adjust the limit of travel of the cushion and further including a cross shaft at one end of each length of rail for carrying said latch and manually rotatable to release the cushion to pivot it rearwardly.

5. A plural cushion seat construction comprising a generally bow-shaped supporting frame common to the cushions and having its ends curved on the arc of a circle, means mounting a center one of said seat cushions to the midportion of said frame, means pivoting individual ones of the outer cushions on an eccentric vertical axis thereto which is fixed relative to said frame adjacent the rear edge thereof, said outer cushions carrying lengths of channel rail which are complementarily curved to and disposed adjacent the respective curved ends of the supporting frame, rollers in contact with the lengths of channel rail to pilot them for endwise running movement, and roller axles fixed to project at spaced points on the curve of the frame and holding the rollers and the lengths of rail thereon in an offset position with proper clearance from the frame for pivoting action of said cushions about their respective eccentric axes.

6. A plural cushion seat construction comprising a generally bow-shaped supporting frame common to the cushions and having its ends curved on the arc of a circle, means on each end of the frame pivoting a cushion on an eccentric axis perpendicular to itself which is fixed relative to said frame adjacent the rear edge thereof, the just named cushions carrying lengths of rail which are complementarily curved to and disposed adjacent the respective curved ends of the supporting frame, said rail being of channel cross section open at one side and presenting short inturned flanges confronting one another at that side, rollers within the channel of said lengths of rail to pilot them for endwise running movement, and projecting roller axles fixed at spaced points on the curve of the frame and protruding between said channels for holding the rollers and the lengths of rail thereon in an offset position with proper clearance for pivoting action of said cushions about their respective eccentric axes.

7. Seat structure with a split type back rest construction comprising a plurality of seat cushions, a generally bow-shaped supporting frame common to the seat cushions and having arcuately curved opposite ends, means swingably mounting a center one of said seat cushions to the midportion of said frame to pivot upwardly from the seating surface so as to be convertible into an arm rest, means pivoting individual outer cushions on an eccentric vertical axis thereto which is fixed relative to said frame adjacent the rear edge thereof, said outer cushions carrying lengths of channel rail which are complementarily curved and shiftably mounted to the respective arcuate ends of the supporting frame in a load carrying relationship to provide for turning action of said outer seat cushions about their respective eccentric pivot axes, said outer cushions further carrying captive back rest cushions turning therewith and having their inner ends adapted to bridge across the center seat cushion to a point of closely spaced confrontations so as to form a common back rest for the seat structure, there being relieved portions formed at the inner ends of said captive back rest cushions to receive the upwardly pivoting center seat cushion.

8. In a seating assembly having a seat cushion, support means for said cushion comprising a generally longitudinally extending frame of supporting members arranged with a curved length of tubing which terminates in a joint formed at one end of the frame, cross straps bridging between the frame members at spaced points to provide foot brackets and presenting rearward strap extensions, a seat cushion frame having a frame member pivotally connecting it at the rear to one of said strap extensions for swinging movement in a plane above said supporting frame, and a rail disposed in the plane of said supporting frame adjacent said curved length of tubing and rigidly affixed to said seat frame member, said curved length of tubing and said rail both arranged to curve on the arc of a circle about said pivotal connection, said curved length of tubing carrying a partial ring of rail engaging rollers having fixed axes and being offset from the tubing to support the rail for freely running on the rollers in a manner to provide for antifriction turning movement of said seat cushion frame about said pivotal connection as a center.

9. In a seating assembly, support means for a seat cushion comprising a generally longitudinally extending frame of supporting members arranged with a pair of relatively straight and curved lengths of tubing forming a joint at an end of the frame, cross straps bridging between said frame members at spaced points to provide foot brackets and presenting rearward strap extensions, a seat cushion frame having a frame member pivotally connecting it at the rear to one of said strap extensions for swinging movement in a plane above said supporting frame, a rail disposed in the plane of said supporting frame adjacent the curved length of tubing and rigidly affixed to said seat frame member, said curved length of tubing and said rail both arranged to curve on the arc of a circle about said pivotal connection, and roller means between said rail and said curved length of tubing to provide for turning movement of said seat cushion frame about said pivotal connection as a center.

10. In a seating assembly, support means for a seat cushion therein comprising a generally longitudinally extending tubular frame of supporting members arranged with an arcuate length of tubing which terminates in a joint formed at an end of the frame, cross straps bridging between the supporting frame members at spaced points to provide foot brackets and presenting rearward strap extensions, a seat cushion frame having a frame member pivotally connecting it at the rear to one of said strap extensions for swinging movement in a plane above said supporting frame, an arcuate length of channel rail disposed in the plane of said tubular frame adjacent said arcuate length of tubing and rigidly affixed to said seat frame member, said arcuate lengths of rail and tubing being curved on the arc of a circle about said pivotal connection as a center, said length of channel being open at the side confronting said arcuate tubing and having inwardly directed flanges forming the margins of said opening, and rollers inside said channel rail having axles protruding between said flanges to a point of rigid connection with said arcuate tubing to pilot said seat cushion frame for turning action on the supporting frame in said next adjacent plane thereto.

11. A seat structure arranged with a plurality of cushions having a common supporting frame, said frame having arcuate portions at the opposite ends and carrying foot brackets intermediately thereof formed of lengths of metal strap and providing rearward strap extensions, a cushion frame at each end of the supporting frame for mounting a cushion at that end and including second lengths of metal strap pivotally connected to different ones of said rearward strap extensions on the foot bracket to allow the associated seat cushion to pivot on a vertical axis offset rearwardly from the supporting frame, each second length of metal strap providing a second rearward strap extension and being rigid with a sliding channel rail provided beneath the cushion frame, said sliding channel rail being adapted to guide on rollers and having a portion mounted to but offset from the arcuate end portions of said supporting frame to allow a turning action of the cushion about said pivot axis, back rests pivoted to different ones of said second strap extensions to move with and fold downwardly upon the seating surface, said outer cushions forming the entire opposite end portions of the seating surface and the eccentricity of said pivot relative to said cushion being such that the axis of the pivot if extended would pass through the back edge at a point closer to the inner side edge of the cushion than to its outer side edge, and a seat slide under the lower portion of the supporting frame enabling forward and rearward adjustment of the structure as a whole independently of the pivoting action of the seat cushions and of the pivoting action of said back rests.

12. A seat structure arranged with a plurality of cushions having a common supporting frame of generally tubular construction, said supporting frame having arcuate portions at the opposite ends and carrying foot brackets intermediately thereof formed of lengths of metal cross strap and providing rearward strap extensions, means swingably mounting a cushion at an intermediate portion of said supporting frame to pivot upwardly from the seating surface so as to be convertible into an arm rest, means at each end of the supporting frame to mount an outer cushion at that end including second lengths of metal strap connected to different ones of said rearward strap extensions on the foot bracket to allow the associated seat cushion to pivot on a vertical axis offset rearwardly from the supporting frame, a partial ring of rollers mounted in an offset position to said arcuate end portions on fixed axes, said second lengths of metal strap forming second rearward strap extensions and having a slide rail carried there beneath which runs on the ring of rollers to allow an antifriction turning action of the cushion about said pivot axis, and back rests pivoted to different ones of said second strap extensions to move with and fold downwardly upon the seating surface, said outer cushions forming the entire opposite end portions of said seating surface and the eccentricity of said pivot axes relative to said cushions being toward the rear edge and toward the center cushion.

13. In a seating means, a plural cushion structure having seat cushions located one at each outer side of a center section, said structure comprising a frame having means to pivot the outer seat cushions from individual laterally offset positions to a midposition mutually defining a center gap for a cushion section, and a split type folding back rest construction formed of upright cushion elements pivoted to different ones of said outer cushions and movable therewith, said upright cushion elements being relieved at a point in their adjacent edges to define an arm rest gap when said outer cushions reach the midposition.

14. In a seating means, a plural cushion structure having seat cushions located one at each outer side of a center section, said structure comprising a frame having means to pivot the outer seat cushions from individual rearwardly offset positions to a forward midposition mutually defining a first gap across said center section, a split type folding back rest construction formed of upright cushion elements pivoted to different ones of said outer cushions, and being relieved at a point in their adjacent edges to define a second gap when in upright position, and arm rest means mounted to present an elevated arm supporting surface above and forwardly of said first and second gaps respectively.

15. In a seating means, a plural cushion structure having seat cushions located one at each outer side of a center section, said structure comprising a common frame having means to pivot the outer seat cushions from individual laterally offset positions to a midposition mutually defining a cushion receiving gap across said center section, the axis for at least one pivoted seat cushion being fixed in spaced relationship behind said common frame in a vertical disposition, and a split type folding back rest construction formed of upright cushion elements pivoted to different ones of said outer cushions and movable therewith, said upright cushion elements being relieved at a point in their adjacent edges to mutually define an arm rest gap when said outer cushions reach the midposition.

16. In a seating means, a plural cushion structure having seat cushions located one at each outer side of a center section, said structure comprising a common frame having means to pivot the outer seat cushions from individual rearwardly offset positions to a forward midposition mutually defining a cushion gap across the center section, a split type folding back rest construction formed of upright cushion elements pivoted to different ones of said outer cushions and movable therewith, said upright cushion elements being relieved at a point in their adjacent edges to define an arm rest gap when said outer cushions reach the midposition, and means to bias said outer cushions to their rearwardly offset position.

17. In a seating means, a plural cushion structure having seat cushions located one at each outer side of a center section, said structure comprising a common frame having means to pivot the outer seat cushions from individual rearwardly offset positions to a forward midposition mutually defining a cushion gap, a split type folding back rest construction formed of a plurality of upright elements each pivotally mounted to said structure whereby it is operable thereon to fold on a general horizontal axis to a folded position, said elements being relieved at a point in their adjacent edges to define an arm rest gap when in the upright position, yieldable means to bias said outer seat cushions individually to their rearwardly offset position, and separate latch means to hold said outer cushions in their forward midposition against the bias of said yieldable means.

18. A plural passenger seat comprising a group of seating elements arranged lengthwise of the seat, longitudinally extending support frame means common to said seating elements, a split type upholstered back rest construction comprising relatively movable upright elements individual to the seating elements of the group, said group comprising two elements mounted to said common frame means to pivot on a fixed axis passing through the rear thereof so as to produce a material degree of side throw to the seating element in swinging through a curved path in that direction, and connections between corresponding seating and back rest elements which include at least certain joints foldable to enable the back rests on the two referred-to seating elements to rotate downwardly thereupon.

19. A plural cushion vehicle seat construction comprising a supporting frame common to the cushions for carrying outer cushions at the respective opposite ends of said frame and a center cushion between the outer cushions; means mounting the center cushion to front and rear cross members of said frame; pivot means rigid with the rear cross member of said supporting frame pivoting outer ones of the cushions on a substantially vertical axis adjacent the rear edge of said cushions, curved ways carried by said outer cushions adjacent the forward portions and substantially concentric with said axis, means including rollers with fixed axes on said frame in rolling contact with said ways to support said cushions for free turning action about their respective pivot axes; spring means connected to the supporting frame and to each outer cushion and each acting in a direction to bias the outer cushion to an outwardly facing position; and a stop carried by each outer cushion engageable with means on said frame to limit the outward swinging movement of said outer cushions.

20. The combination set forth in claim 19 together with latch means operative to hold said cushions in forwardly facing position against turning tension of said spring means.

21. A front seat assembly for a vehicle comprising a frame mounted in the front of said vehicle and extending laterally between the vehicle front doors; means mounting said frame for movement forwardly and rearwardly of said vehicle; a pair of seat assemblies each comprising a seat bottom and seat back; cooperating pivot means on the seat bottom and said frame mounting each of said seat assemblies for pivotal movement about a separate substantially vertical axis individual to each of said seat assemblies located adjacent the rear of said frame and the rear of the seat bottoms; and cooperating arcuate track and track engaging constructions individual to each of said seat assemblies and interposed between said seat bottoms and said frame in substantially concentric relation with said axis to support said seat assemblies for swinging movement between forwardly facing positions and outwardly facing positions in which latter position a substantial portion of said seat assemblies projects through the adjacent doorway.

22. A front seat assembly for a vehicle comprising a frame structure adapted to be mounted within said vehicle; means mounting said frame structure for movement forwardly and rearwardly of said vehicle; a seat assembly comprising a seat bottom and seat back; cooperating pivot means on said seat bottom and frame structure mounting said seat assembly for pivotal movement about a vertical axis located adjacent the rear of said frame structure and outwardly of the rear inner corner of said seat bottom; and cooperating arcuate track and roller construction interposed between said seat bottom and said frame structure in substantially concentric relation with said axis to support said seat assembly for swinging movement between forwardly facing and outwardly facing positions in which latter position a substantial portion of said seat bottom projects through the adjacent doorway.

23. A front seat assembly for a vehicle comprising a transverse rigid frame structure adapted to be mounted within said vehicle; two seat assemblies mounted on said frame and each comprising a seat bottom and seat back; cooperating pivot means on each said bottom and the frame structure mounting each said seat assembly for pivotal movement about a substantially vertical axis located adjacent the rear of said frame structure and spaced outwardly a substantial distance from the inner rear corner of said seat assembly; and cooperating arcuate track and roller construction interposed between each said bottom and said frame structure in substantially concentric relation with said axis to support and guide said seat assemblies for swinging movement between forwardly facing and oppositely outwardly facing positions, resilient means between each said bottom and said frame structure biasing said seat assemblies toward said outwardly facing position, and releasable means for latching each seat assembly in forwardly facing position.

24. A front seat assembly for a vehicle comprising a transverse rigid sub-frame structure adapted to be mounted within said vehicle; at least one seat assembly comprising a seat frame; cooperating pivot means on said seat frame and the sub-frame structure mounting said seat assembly for pivotal movement about a substantially vertical axis located adjacent the rear of said sub-frame structure and spaced a substantial distance outwardly of the inner rear corner of said seat assembly; cooperating arcuate track and roller construction interposed between each said seat frame and said sub-frame structure in substantially concentric relation with said axis to support and guide said seat assembly for swinging movement between forwardly facing and oppositely outwardly facing positions, resilient means between said seat frame and said sub-frame structure biasing said seat assembly toward said outwardly facing position, and releasable means for latching said seat assembly in forwardly facing position.

25. A front seat assembly for a vehicle comprising a transverse rigid sub-frame adapted to be mounted within said vehicle; at least one seat assembly mounted on said sub-frame and comprising a seat frame; cooperating pivot means on said seat frame and sub-frame for mounting said seat assembly for pivotal movement about a substantially vertical axis located adjacent the rear of said sub-frame and spaced a substantial distance outwardly of the inner rear corner of said seat assembly; cooperating track and roller construction interposed between said seat frame and said sub-frame to support and guide said seat assembly for swinging movement between forwardly facing and outwardly facing positions, resilient means between said seat frame and said sub-frame for biasing said seat assembly toward said outwardly facing position, releasable means for latching said seat assembly in forwardly facing position and means for adjusting said sub-frame bodily within said vehicle.

26. A front seat assembly for a vehicle comprising a frame mounted in said vehicle and extending laterally between the vehicle front doors; means mounting said frame for movement forwardly and rearwardly of said vehicle; a pair of seat assemblies each comprising a seat bottom and a seat back; cooperating pivot means on said seat bottom and said frame mounting each of said seat assemblies for pivotal movement about a separate substantially vertical axis individual to each of said seat assemblies located adjacent the rear of said frame and the rear of said seat bottom; cooperating arcuate track and track engaging constructions individual to each of said seat assemblies and interposed between said seat bottoms and said frame in substantially concentric relation with said axis to support said seat assemblies for swinging movement between forwardly facing positions and outwardly facing positions in which latter position a substantial portion of said seat assemblies project through the adjacent doorway; resilient means between each said seat bottom and said frame for biasing said seat assemblies for swinging movement about said axis; and cooperating releasable latch assemblies on each of said seat bottoms and said frame for releasably latching each seat assembly in said forwardly facing position.

References Cited in the file of this patent

UNITED STATES PATENTS

| | | |
|---|---|---|
| 2,409,114 | Elleman | Oct. 8, 1946 |
| 2,576,004 | Fair | Nov. 20, 1951 |
| 2,633,581 | St. Martin | Apr. 7, 1953 |
| 2,740,463 | Young | Apr. 3, 1956 |
| 2,771,123 | Clark | Nov. 20 1956 |